United States Patent
Chia et al.

(10) Patent No.: US 10,277,926 B2
(45) Date of Patent: Apr. 30, 2019

(54) BLOCK-BASE ERROR MEASURE METHOD FOR OBJECT SEGMENTATION

(71) Applicant: MING CHUAN UNIVERSITY, Taipei (TW)

(72) Inventors: Chung-Lin Chia, Taoyuan (TW); Chaur-Heh Hsieh, Taipei (TW)

(73) Assignee: Ming Chuan University, Taipei (TW)

( * ) Notice: Subject to any disclaimer, the term of this patent is extended or adjusted under 35 U.S.C. 154(b) by 0 days.

(21) Appl. No.: 15/686,536

(22) Filed: Aug. 25, 2017

(65) Prior Publication Data

US 2018/0278974 A1 Sep. 27, 2018

(30) Foreign Application Priority Data

Mar. 27, 2017 (TW) .............................. 106110089 A

(51) Int. Cl.
| | |
|---|---|
| G06K 9/00 | (2006.01) |
| H04N 21/2343 | (2011.01) |
| G06T 7/215 | (2017.01) |
| G06T 7/223 | (2017.01) |
| H04L 1/00 | (2006.01) |
| G06T 9/20 | (2006.01) |
| G06F 17/11 | (2006.01) |

(52) U.S. Cl.
CPC ..... H04N 21/234327 (2013.01); G06T 7/215 (2017.01); G06T 7/223 (2017.01); G06F 17/11 (2013.01); G06T 9/20 (2013.01); G06T 2207/20128 (2013.01); H04L 1/0057 (2013.01)

(58) Field of Classification Search
CPC combination set(s) only.
See application file for complete search history.

(56) References Cited

U.S. PATENT DOCUMENTS

| | | | |
|---|---|---|---|
| 2003/0039382 A1* | 2/2003 | Yau ................... | G06K 9/00067 382/125 |
| 2007/0160286 A1* | 7/2007 | Haque ................ | G06K 9/38 382/164 |

OTHER PUBLICATIONS

Noreen, Neelum, MRI Segmentation through Wavelets and Fuzzy C-means, 2011, World Applied Sciences Journal 13 (Special Issue of Applied Math).*

* cited by examiner

*Primary Examiner* — Alex Kok S Liew
(74) *Attorney, Agent, or Firm* — Rosenberg, Klein & Lee

(57) ABSTRACT

A block-base error measure method for object segmentation includes the steps of dividing a reference image having an object into plural non-overlapping blocks, superimposing the reference image with a segmented image to obtain an error ratio of the block to define an enhanced equation and a modification equation to suppress the scattered error and enhance the contribution of the region error, so as to calculate the error amount of the segmented image and evaluate the performance of image segmentation. Compared with the conventional error measure method based on pixels, the present invention provides a more accurate high-level semantic.

9 Claims, 10 Drawing Sheets

BLOCK-BASE ERROR MEASURE METHOD FOR OBJECT SEGMENTATION

FIELD OF INVENTION

The present invention relates to a block-based error measure method for object segmentation, in particular to the method used for analyzing and evaluating the performance of object segmentation.

BACKGROUND OF INVENTION

1. Description of the Related Art

Image object segmentation is an important research subject for computer vision, since it has a large variety of applications such as object recognition, video surveillance, human machine interface, traffic monitoring, etc, and thus academics and related industries have made extensive efforts to develop object segmentation techniques for images and videos, and proposed many object segmentation methods, but much less attention has been paid to the performance evaluation of these techniques, which is unfavorable for the development of object segmentation.

The conventional performance evaluation of object segmentation is a pixel-based error measure which primarily calculates the pixel error between a reference object and the segmented object, and generally does not take the spatial distribution of segmentation errors into consideration, but the spatial distribution of segmentation errors is very important to the subsequent high-level semantic processing. For example, when the segmentation errors show up in blocks, it probably means that a certain segmented object has a missing block, and there is a risk of causing a wrong decision in the subsequent semantic processing such as object recognition. On the other hand, if the segmentation error is a scattered error, then the recognition result will be affected very little, so that the region error is much more important than the scattered error.

With reference to FIG. 1a for a reference image 10 having an object 101 and FIG. 1b for a segmented image 20 after the object segmentation, the segmented image 20 obviously has a background region error. Assumed that the reference image 10 has B background blocks with a size of m×n, F foreground blocks with a size of m×n. And assume there are K (m×n) error pixels in a background region 201 of the segmented image 20. Then the conventional pixel error measure for background error is represented by Mathematical Equation 1 as follows:

$$\frac{K(mn)}{B(mn)} = \frac{K}{B}.$$

With reference to FIG. 2 for an error measure analysis chart, Mathematical Equation 1 shows that the conventional pixel-base error measure does not take the size of value of error blocks I into consideration, but just relates to the quantity K of the error pixels, so that the calculated result is a constant. As shown in FIG. 2, the error amount (represented by the height of the column) in each row is equal. Obviously, the conventional pixel-base error measure method fails to show that there is a region error.

Similarly, FIG. 1c shows that the foreground has a region error, and the conventional error measure of a foreground image 202 of a segmented image 20 is represented by Mathematical Equation 2 as follows:

$$\frac{K(mn)}{F(mn)} = \frac{K}{F}$$

Similarly, the calculated result is also a constant, and it also fails to show that the segmented image 20 has region errors.

In view of the drawbacks of the conventional error measure methods, the inventor of the present invention further conducted extensive research and experiment to evaluate the performance of the image object segmentation and finally modified the conventional error measure methods and provided a feasible solution to overcome the drawbacks of the prior art.

2. Summary of the Invention

Therefore, it is a primary objective of the present invention to overcome the drawbacks of the prior art by providing a block-base error measure method for object segmentation, comprising the steps of: dividing a reference image having at least one object into a plurality of non-overlapping blocks; superimposing the reference image with a segmented image to obtain an error ratio of the block; defining a threshold value, and defining an enhanced equation according to the threshold value and the error ratio to convert the error ratio into an enhanced error ratio; calculating a modified weight value of the block according to the correlation between the enhanced error ratio of the block and its neighbor block; and calculating an error amount of the segmented image according to the modified weight value.

The block-base error measure method for object segmentation further comprises the steps of: defining the block without the object as a background block, and the remaining part as a foreground region; further segmenting the foreground region into a plurality of non-overlapping foreground blocks, wherein the foreground block may contain complete object pixels or contain partial object pixels (called object part) plus partial non-object pixels (called non-object part); obtaining a miss detected pixel and a foreground false alarm pixel of the foreground block and a background false alarm pixel of the background block after the superimposition; and defining an error ratio including a foreground miss detection ratio, a foreground false alarm ratio and a background false alarm ratio, wherein the foreground miss detection ratio is a ratio of the number of miss detected pixels to the total number of pixels of the foreground object block, and the foreground false alarm ratio is the ratio of the number of foreground false alarm pixels to the total number of background pixels of the non-object part, and the background false alarm ratio is the ratio of the number of background false alarm pixels to the total number of pixels of the background block.

The block-base error measure method for object segmentation further comprises the steps of: calculating a ratio weight value according to the error ratio; and defining the enhanced equation according to the threshold value, the error ratio, and the ratio weight value.

In the block-base error measure method for object segmentation, the ratio weight value of the foreground miss detection is the ratio of the total number of missed detected pixels of the foreground object part to the total number of pixels of the foreground block, and the ratio weight value of the foreground false alarm is the ratio of total number of foreground false alarm pixels to the total number of pixels of the foreground block, and the ratio weight value of the background false alarm is the ratio of the total number of background false alarm pixel to the total number of pixels of the background block.

The block-base error measure method for object segmentation further comprises the steps of: defining a control variable according to the error ratio through the numerical value of the threshold value; and providing the error ratio with to the respective control variable to enhance the respective error ratio.

In the block-base error measure method for object segmentation, the enhanced equation is shown in the following Equation 1:

$$ER_{Fk}^i = \left\{ \begin{array}{ll} \left( \dfrac{R_{Fk}^i - T}{\left(1 - \dfrac{1}{T}\right) \cdot (g_{Fk}^i - (1+T))} \right)^t, & 0 < t < 1,\ T \le R_{Fk}^i \le 1,\ g_{Fk}^i \le 1 \\ 0, & \text{Otherwise} \end{array} \right.$$

$$Fk = \{F\_md,\ F\_fa\}$$

$$ER_{Bk}^j = \left\{ \begin{array}{ll} \left( \dfrac{R_{Bk}^j - T}{\left(1 - \dfrac{1}{T}\right) \cdot (g_{Bk}^j - (1+T))} \right)^t, & 0 < t < 1,\ T \le R_{Bk}^j \le 1,\ g_{Bk}^j \le 1 \\ 0, & \text{Otherwise} \end{array} \right.$$

$$Bk = \{B\_fa\}$$

(Equation 1)

Wherein, the reference image has F foreground blocks and B background blocks, i=1, 2, . . . , F, j=1, 2, . . . , B;

$R_{F\_md}^i$ is a foreground miss detection ratio; $R_{F\_fa}^i$ is a foreground false alarm ratio; $R_{B\_fa}^j$ a background false alarm ratio; $ER_{Fk}^i$ and $Er_{Bk}^j$ are enhanced error ratios of the foreground block and background block, respectively; $g_{F\_md}^i$ is a ratio weight value of foreground miss detection; $g_{F\_fa}^i$ is a ratio weight value of foreground false alarm; $g_{B\_fa}^j$ is a ratio weight value of background false alarm; T is a threshold value; and t is a control variable.

The block-base error measure method for object segmentation further comprises the steps of: obtaining an error modification value of each block according to a modification equation defined by the enhanced error ratio, the ratio weight value, the threshold value and the modified weight value; and calculating an error amount of the segmented image according to the error modification value.

In the block-base error measure method for object segmentation, the modified weight value is calculated according to the ratio of the enhanced error ratio of the block and the object included in a neighbor block thereof.

The block-base error measure method for object segmentation further comprises the steps of: obtaining an error modification value of each block according to a modification equation defined by the enhanced error ratio, the ratio weight value, the threshold value and the modified weight value; and calculating an error amount of the segmented image according to the error modification value; wherein the modification equation is shown in the following Equation 2:

$$ME_{Fk}^i = \dfrac{1}{W_{Fk}^i} \left( ER_{Fk}^i \cdot g_{Fk}^i + \sum_{\substack{F_h \in Neighbor(F_i) \\ ER_{Fk}^i \ge ER_{Fk}^h > T}} ER_{Fk}^h \cdot g_{Fk}^h \right),$$

(Equation 2)

$$ER_{Fk}^i > T$$

Where $W_{Fk}^i = \sum_{F_l \in (F_i, Neighbor(F_i))} g_{Fk}^l$ $$ME_{Bk}^j = \dfrac{1}{W_{Bk}^j} \left( ER_{Bk}^j \cdot g_{Bk}^j + \sum_{\substack{B_h \in Neighbor(B_j) \\ ER_{Bk}^j \ge ER_{Bk}^h > T}} ER_{Bk}^h \cdot g_{Bk}^h \right),$$

$$ER_{Bk}^j > T$$

Where $W_{Bk}^j = \sum_{B_l \in (B_j, Neighbor(B_j))} g_{Bk}^l$

Wherein, $ME_{Fk}^i$ and $ME_{Bk}^j$ are error modification values; $g_{Fk}^h$, $g_{Fk}^l$, $g_{Bk}^h$ and $g_{Bk}^l$ are modified weight values, h is an element of a set formed by neighbor blocks of the block, and l is a element of a set formed by the block and the neighbor blocks thereof.

In the block-base error measure method for object segmentation, the error amounts of a whole image are obtained by the error modification values of image blocks according to Equation 3:

$$TE_{Fk} = \dfrac{1}{F} \sum_{i=1}^{F} ME_{Fk}^i$$

(Equation 3)

$$TE_{Bk} = \dfrac{1}{B} \sum_{j=1}^{B} ME_{Bk}^j$$

Wherein, $TE_{Fk}$ and $TE_{Bk}$ are error amounts of a whole image.

In summation of the aforementioned description and method, the present invention has the following advantages and effects:

1. The present invention divides an image into blocks to calculate an error ratio of the blocks of a segmented image and a reference image, and substitute the error ratio into an enhanced equation and a modification equation to suppress a scattered error, and enhance a region error, and further calculates the error amount of the segmented image to evaluate the performance of the image segmentation to facilitate a subsequent high-level semantic processing.

DESCRIPTION OF THE PREFERRED EMBODIMENTS

To make it easier for our examiner to understand the objective of the invention, its structure, innovative features, and performance, we use a preferred embodiment together with the attached drawings for the detailed description of the invention. Exemplary embodiments are illustrated in referenced figures of the drawings. It is intended that the embodiments and figures disclosed herein are to be considered illustrative rather than restrictive.

Figure 3:
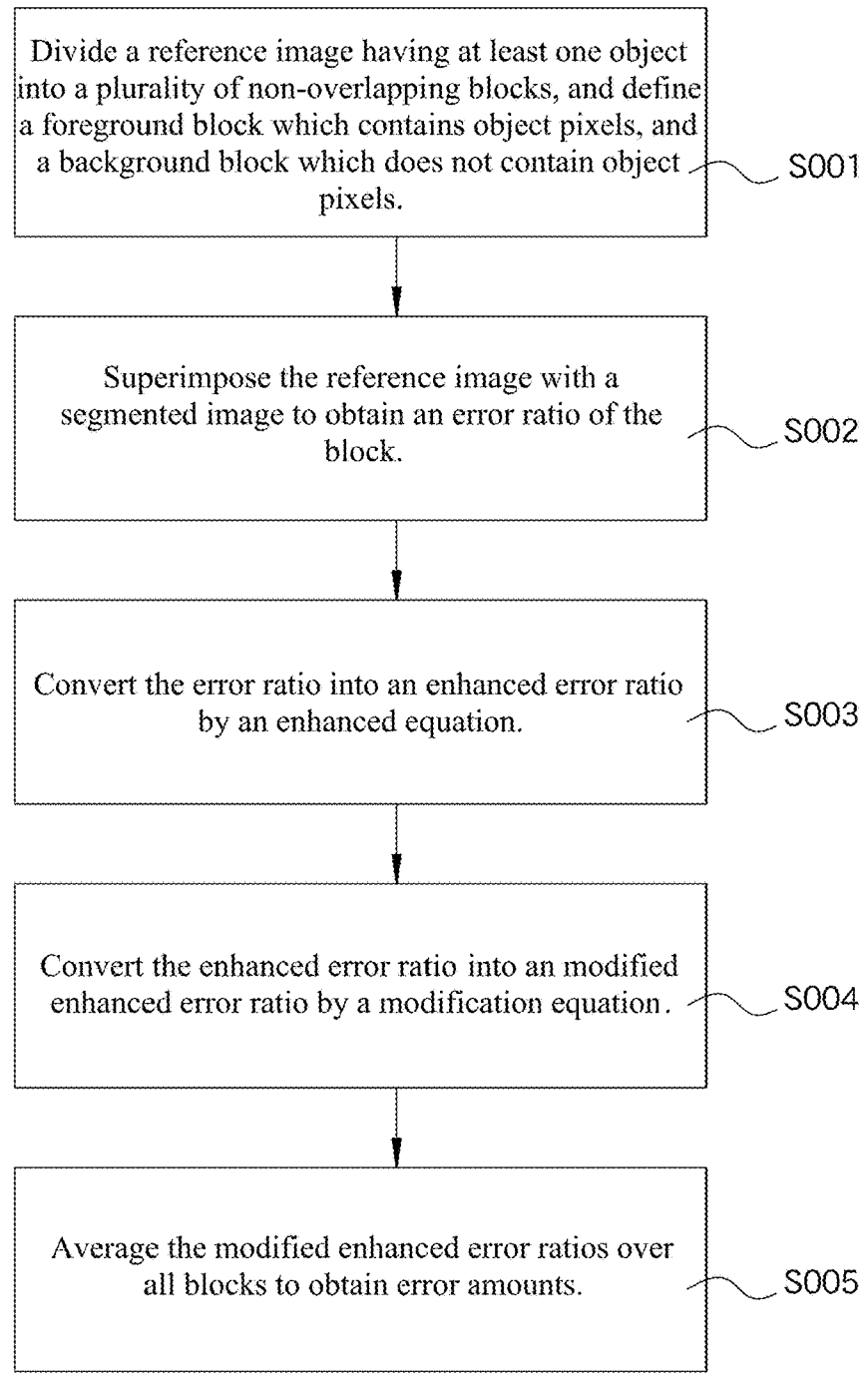
FIG. 3 is a flow chart of the present invention.

With reference to FIG. 3 for a block-base error measure method for object segmentation in accordance with the present invention, the method comprises the following steps:

S001: A reference image 10 with at least one object 101 is divided into a plurality of non-overlapping blocks.

In a specific embodiment, assumed that the reference image 10 is Ig having an area of M×N; the reference image 10 includes pixels of the object 101 and the non-object 101 and the pixel including the object 101 is 1, and the pixel not including the pixel is 0; and the reference image 10 is divided into m×n blocks, and the block not including the object 101 is defined as a background block BB, and the remaining part is defined as a foreground region;

The foreground region is further divided into $$\left(\frac{m}{2}\right) \times \left(\frac{n}{2}\right) = k \times l$$

non-overlapping foreground blocks FB, wherein the foreground block may contain complete object pixels or contain partial object pixels (called object part FO) plus partial non-object pixels (called non-object part FNO)

Therefore, the reference image 10 may be divided into F foreground blocks and B background blocks, and the following Mathematical Equation 3 is obtained:

$$I_g = \{FB_i\} \cup \{BB_j\}, i=1,2,\ldots,F, j=1,2,\ldots,B$$

$$k \cdot l \cdot F + m \cdot n \cdot B = M \cdot N \quad \text{[Mathematical Equation 3]}$$

As described above, each foreground block FB includes pixels of an object 101 and a non-object 101 which have the values of 1 and 0 respectively, as shown in the following Mathematical Equation 4:

$$FB_i = FO_i \cup FNO_i \quad \text{[Mathematical Equation 4]}$$

Where $$FO_i = \{I_g(x,y) | (x,y) \in FB_i, I_g(x,y)=1\}$$

$$FNO_i = \{I_g(x,y) | (x,y) \in FB_i, I_g(x,y)=0\}$$

From Mathematical Equation 4, the following Mathematical Equation 5 is obtained:

$$|FB_i| = |FO_i| + |FON_i| = k \cdot l \quad \text{[Mathematical Equation 5]}$$

The background block BB just includes pixels not including the object 101, so that the following Mathematical Equation 6 is obtained:

$$BNO_j = \{I_g(x,y) | (x,y) \in BB_j, I_g(x,y)=0\}$$

$$|BB_j| = |BNO_j| = m \cdot n \quad \text{[Mathematical Equation 6]}$$

As to a segmented image 20, the segmented image 20 is set to be Is, and also has an area of M×N; and includes the pixel SO of the object 101 and the pixel SNO of the non-object 101, so that the following Mathematical Equation 7 is obtained:

$$I_g = SO \cup SNO \quad \text{[Mathematical Equation 7]}$$

Where $$SO = \{I_g(x,y) | I_g(x,y)=1\}$$

$$SNO = \{I_g(x,y) | I_g(x,y)=0\}.$$

S002: The reference image 10 and the segmented image 20 are superimposed to obtain an error ratio of the block.

Figure 4:
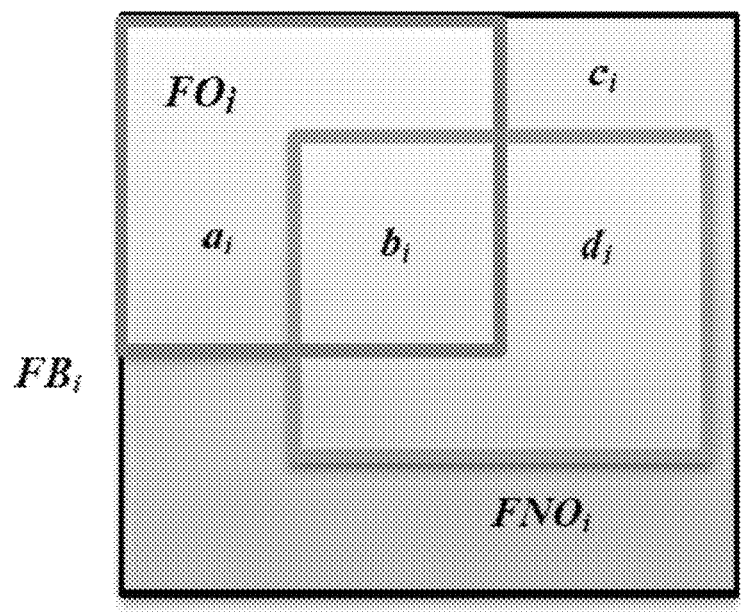
FIG. 4 is an analysis chart of a set of foreground blocks of the present invention.

In a specific embodiment, each foreground block is segmented after the superimposition as shown in FIG. 4 and the following Mathematical Equation 8:

$$FO_i = \{a_i\} \cup \{b_i\} \text{ and } FNO_i = \{c_i\} \cup \{d_i\}$$

So, $$FB_i = FO_i \cup FNO_i = \{a_i\} \cup \{b_i\} \cup \{c_i\} \cup [d_i] \quad \text{[Mathematical Equation 8]}$$

Where, $\{a_i\}$ is the set of miss detected part of the foreground block $FB_i$ with the number of pixels $a_i$, $\{b_i\}$ is the set of correctly detected part of the foreground block $FB_i$ with the number of pixels $b_i$, $\{c_i\}$ is the set of correctly detected part of the background pixels in the foreground block $FB_i$ with the number of pixels $c_i$, and $\{d_i\}$ is the set of false alarm of the foreground block $FB_i$ with the number of pixels $d_i$, which is the foreground false alarm pixel.

Figure 5:
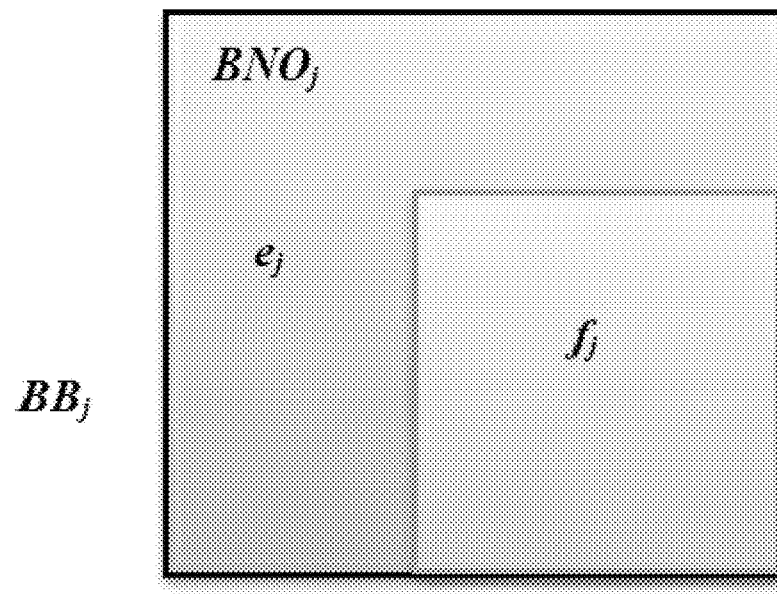
FIG. 5 is an analysis chart of a set of background blocks of the present invention.

As to each background block $BB_j$, the aforementioned segmentation can be performed as shown in FIG. 5 and the following Mathematical Equation 9:

$$BNO_j = \{e_j\} \cup \{f_j\} \quad \text{[Mathematical Equation 9]}$$

Where, $\{e_j\}$ is the set of correctly detected part of the background block $BB_j$ with the number of pixels $e_j$, $\{f_j\}$ is the set of incorrectly detected background block $BB_j$ with the number of pixels $f_j$ which is the background false alarm pixel.

As described above, the error ratio can be calculated. In this preferred embodiment, the error ratio includes a foreground miss detection ratio, a foreground false alarm ratio and a background false alarm ratio, and the foreground miss detection ratio is the ratio of the number of miss detected pixels $a_i$ in the foreground object block to the total number of pixels in the foreground object block, and the foreground false alarm ratio is the ratio of the number of foreground false alarm pixels $d_i$ in the foreground object block to the number of background pixels of the non-object part, and the background false alarm ratio is the number of background false alarm pixel $f_j$ in the background block to the total number of pixels in the background block.

The foreground miss detection ratio $R_{F\_md}{}^i$ of the foreground block $FB_i$ is shown in the following Mathematical Equation 10:

$$R_{F\_md}^i = \frac{N_{F\_md}^i}{N_{F\_t}^i} = \frac{a_i}{a_i + b_i} \qquad \text{[Mathematical Equation 10]}$$

Where, $N_{F\_t}{}^i$ is the number of pixels having the object 101 in the foreground block $FB_i$, and $N_{F\_md}{}^i$ and is the number of pixels of the miss detection.

The foreground false alarm ratio $R_{F\_fa}{}^i$ of the foreground block $FB_i$ is shown in the following Mathematical Equation 11:

$$R_{F\_fa}^i = \frac{N_{F\_fa}^i}{N_{F\_tn}^i} = \frac{d_i}{c_i + d_i} \qquad \text{[Mathematical Equation 11]}$$

Where, $N_{F\_tn}{}^i$ is the number of pixels having the non-object 101 in the foreground block $FB_i$, and $N_{F\_md}{}^i$ is number of pixels of the false alarm.

The background false alarm ratio of the background block $BB_j$ is shown in the following Mathematical Equation 12:

$$R_{B\_fa}^j = \frac{N_{B\_fa}^j}{N_{B\_tn}^j} = \frac{f_j}{e_j + f_j} = \frac{f_j}{mn} \qquad \text{[Mathematical Equation 12]}$$

Where, $N_{B\_tn}{}^j$ is the number of pixels in the background block $BB_j$, and $N_{E\_fa}{}^j$ is the number of pixels of the false alarm.

S003: A threshold value is defined, and an error enhanced equation is defined according to the threshold value and the error ratio to convert the error ratio into an enhanced error ratio. In a preferred embodiment, a ratio weight value is calculated according to the error ratio, and the enhanced equation is defined according to the threshold value, the error ratio and the ratio weight value. In a preferred embodiment, the ratio weight value of the foreground miss detection is the ratio of the foreground object block to the foreground block, and the ratio weight value of the foreground false alarm is the ratio of the non-object part to the foreground block, and the ratio weight value of the background false alarm is the ratio of the background false alarm pixel to the background block.

Specifically, the enhanced equation is intended for providing a larger computation amount for a larger error of the error ratio and reducing the error appropriately for a smaller error. In addition, a smaller object 101 is eliminated for the calculation of the ratio weight value in order to avoid a large error.

Figure 6:
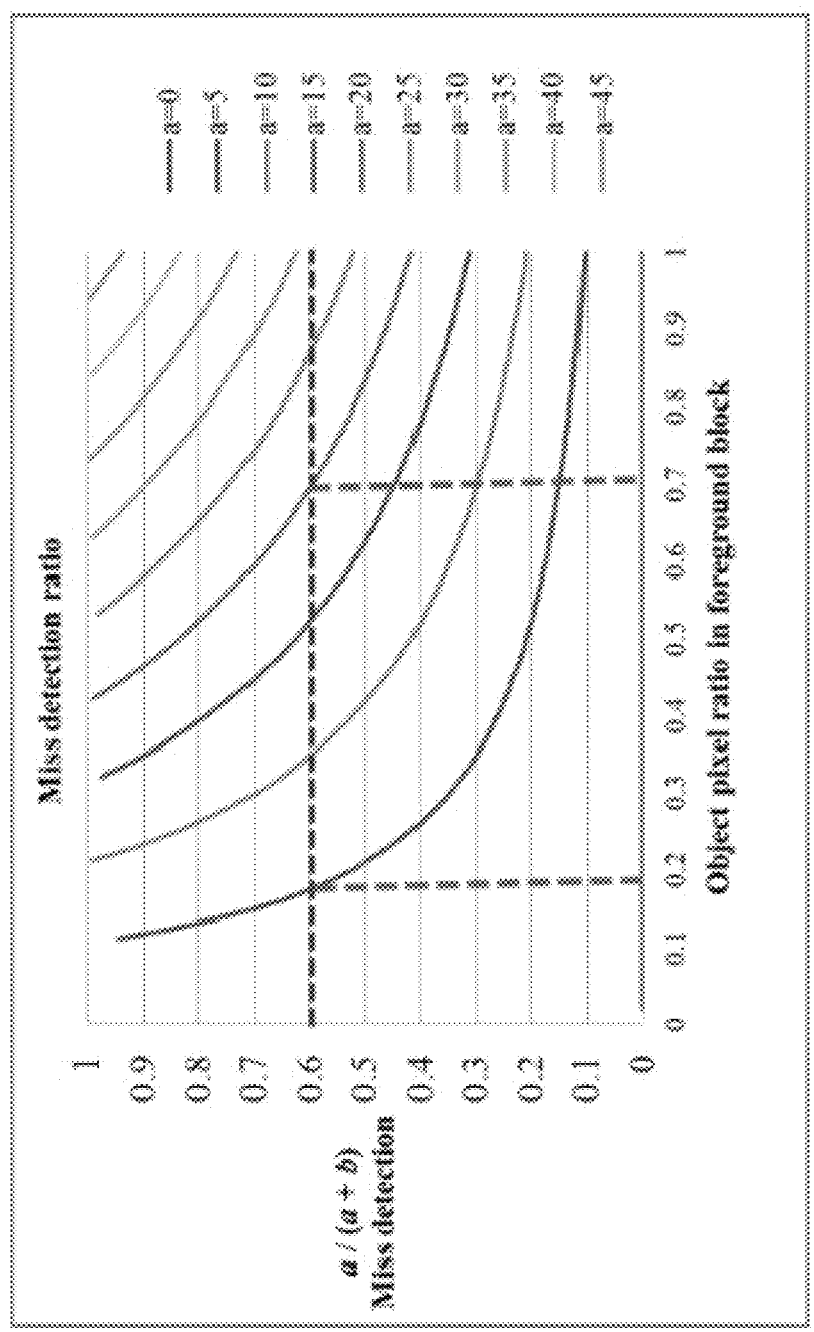
FIG. 6 is a diagram of experimental lines of an error ratio of the present invention.

In an example as shown in FIG. 6, if the pixel of the object 101 in the foreground block has a ratio of 0.7 and the miss detected pixel is 20, then the foreground miss detection ratio will be 0.6. However, if the pixel of the object 101 in the foreground block has a ratio of 0.2 and the miss detected pixel is 5, then the foreground miss detection ratio will be 0.6. Obviously, a smaller object 101 may cause a larger error ratio easily.

To satisfy the aforementioned conditions, the principle of enhancing the error in accordance with a preferred embodiment is described below:

1. A smaller error ratio is suppressed, and a larger error ratio is enhanced, so that a defined threshold value T allows the error ratio of the threshold value T to be ignored. As to a large threshold value T, a control variable t with a corresponding enhanced weight is given according to the numerical value. The larger the error ratio, the higher the enhanced weight.

2. As to the problem of having a too-large error ratio due to too-small area $a_i+b_i$ of the object 101 and area $c_i+d_i$ of the object 101, a corresponding weight is given according to the size of the area of the object 101 as shown in the following Mathematical Equation 13:

$$g_{F\_md}^i = \frac{a_i + b_i}{kl}, \qquad \text{[Mathematical Equation 13]}$$

$$g_{F\_fa}^i = \frac{c_i + d_i}{kl},$$

$$g_{B\_fa}^j = \frac{f_j}{mn}$$

Where, $g_{F\_md}{}^i$ is the ratio weight value of foreground miss detection, $g_{F\_fa}{}^i$ is the ratio weight value of foreground false alarm, and $g_{B\_fa}{}^i$ is the ratio weight value of background false alarm. It indicates the proportion of the object 101 and the segmented area occupied in each block. The larger the ratio weight value, the more significant the error amount. In a preferred embodiment, the enhanced equation is defined in the following Mathematical Equation 14:

[Mathematical Equation 14]

$$ER_{Fk}^i = \begin{cases} \left(\dfrac{R_{Fk}^i - T}{\left(1 - \dfrac{1}{T}\right) \cdot (g_{Fk}^i - (1+T))}\right)^t, & 0 < t < 1, T \le R_{Fk}^i \le 1, g_{Fk}^i \le 1 \\ 0, & \text{Otherwise} \end{cases}$$

$$Fk = \{F\_md, F\_fa\}$$

$$ER_{Bk}^j =$$

$$\begin{cases} \left(\dfrac{R_{Bk}^j - T}{\left(1 - \dfrac{1}{T}\right) \cdot (g_{Bk}^j - (1+T))}\right)^t, & 0 < t < 1, T \le R_{Bk}^j \le 1, g_{Bk}^j \le 1 \\ 0, & \text{Otherwise} \end{cases}$$

$$Bk = \{B\_fa\}$$

Where, $ER_{Fk}{}^i$ and $ER_{Bk}{}^j$ and are enhanced error ratios of the error ratio.

The calculated error ratio of all blocks is used to convert the error ratio into an enhanced error ratio according to the aforementioned enhanced equation.

Figure 7:
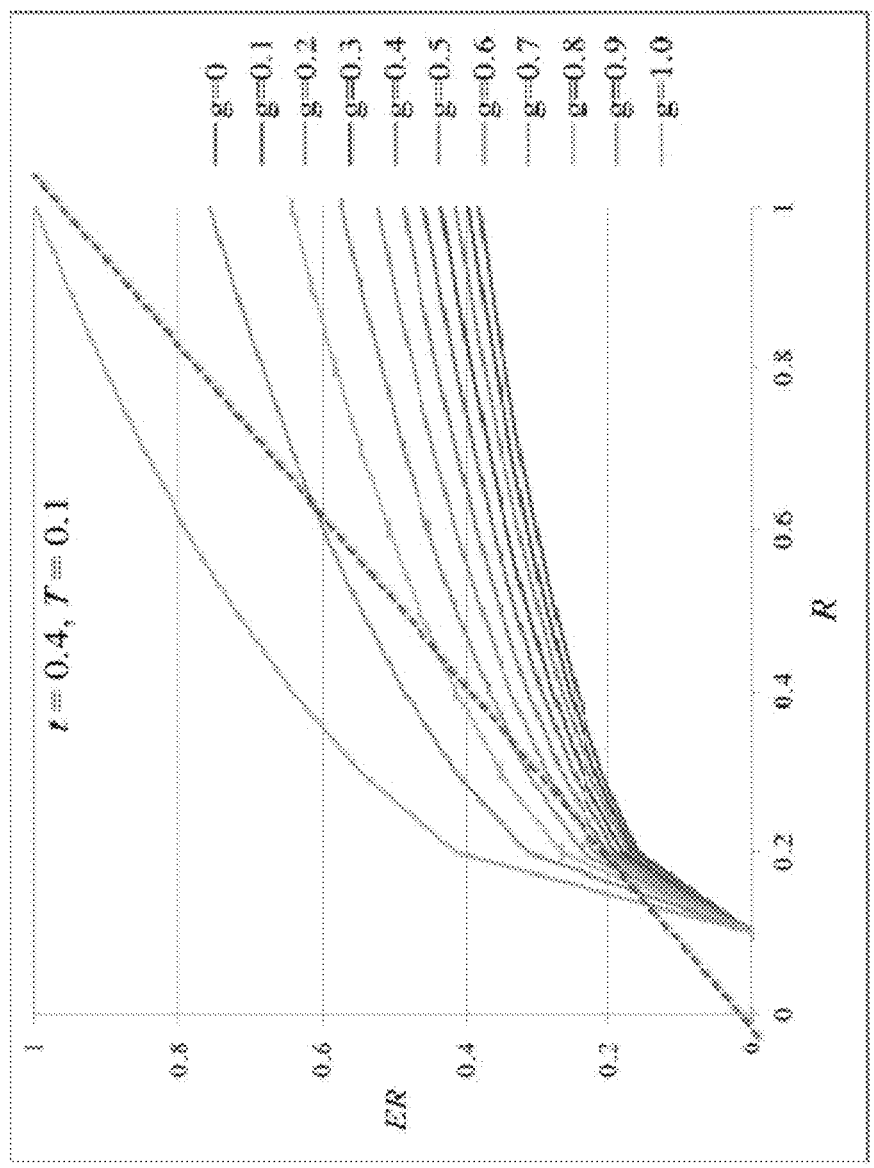
FIG. 7 is a diagram showing the experimental relation between an error ratio and an enhanced error ratio of the present invention.

With reference to FIG. 7 for the relation between an error ratio and an enhanced error ratio of a specific embodiment, the lower limit of error of the threshold value T such as 0.1 is taken into consideration, and the control variable t is set to be 0.1, and k×l=8×6, and m×n=16×12.

S004: A modified weight value of the block is calculated according to the correlation between the enhanced error ratio of the block and its neighbor blocks such as the ratio containing the object 101. Since a large-area error region catches visual attention severely, and a small-area error region may be ignored, therefore the ratio of the number of objects 101 included in the neighbor blocks may be used to determine whether the error region has a large error amount. If there are many errors existed in the currently processed block, its neighbor blocks will also have a large error amount, so that the error will be very obvious in the overall vision. Therefore, the error amount of the neighbor blocks is very important in order to modify or adjust the error.

In a preferred embodiment, an error modification equation is defined according to the enhanced error ratio, the ratio weight value, the threshold value and the modified weight value to obtain an error modification value of each block.

In a preferred embodiment, the modification equation is defined in the following Mathematical Equation 15 to keep the error modification value $ME_{Fk}^i$ and $ME_{Bk}^j$ between [0,1]:

[Mathematical Equation 15]

$$ME_{Fk}^i = \frac{1}{W_{Fk}^i}\left(ER_{Fk}^i \cdot g_{Fk}^i + \sum_{\substack{F_h \in Neighbor(F_i) \\ ER_{Fk}^i \geq ER_{Fk}^h > T}} ER_{Fk}^h \cdot g_{Fk}^h\right), ER_{Fk}^i > T$$

Where $W_{Fk}^i = \sum_{F_l \in \{F_i, Neighbor(F_i)\}} g_{Fk}^l$ $$ME_{Bk}^j = \frac{1}{W_{Bk}^j}\left(ER_{Bk}^j \cdot g_{Bk}^j + \sum_{\substack{B_h \in Neighbor(B_j) \\ ER_{Bk}^j \geq ER_{Bk}^h > T}} ER_{Bk}^h \cdot g_{Bk}^h\right), ER_{Bk}^j > T$$

Where $W_{Bk}^j = \sum_{B_l \in \{B_j, Neighbor(B_j)\}} g_{Bk}^l$

Where, $g_{Fk}^h$, $g_{Fk}^l$, $g_{Bk}^h$ and $g_{Bk}^l$ and are modified weight values, h is a member of a set formed by the neighbor blocks of the block, and l is a member of a set formed by the block and its neighbor blocks.

Since the error area weight of the neighbor blocks is used for calculation, it is always greater than the total error area weight of all calculated blocks, and since $ER_{Fk}^i$ and $ER_{Bk}^j$ fall within [0, 1], therefore ME falls within [0, 1].

If the currently calculated block and its neighbor blocks are valid and the error of the currently calculated block is greater than the error of its neighbor block, a larger error area will be formed and will be enhanced and modified. In experiments of the present invention, such definition method is simple and effective without requiring the definition of additional threshold parameters.

S005: An error amount of the segmented image 20 is calculated according to the modified weight value after the weight value is modified. Preferably, the obtained error modification value is used to calculate an error amount of the segmented image 20. In a preferred embodiment, the error amounts of a whole image include the average of the errors of all foreground blocks, and the average of the errors of all background blocks, which are obtained in the following Mathematical Equation 16:

[Mathematical Equation 16]

$$TE_{Fk} = \frac{1}{F}\sum_{i=1}^{F} ME_{Fk}^i \quad \text{(Equation 3)}$$

$$TE_{Bk} = \frac{1}{B}\sum_{j=1}^{B} ME_{Bk}^j$$

Where, $TE_{Fk}$ and $TE_{Bk}$ are error amounts of the whole image.

Preferred Embodiment 1

Figure 1A:
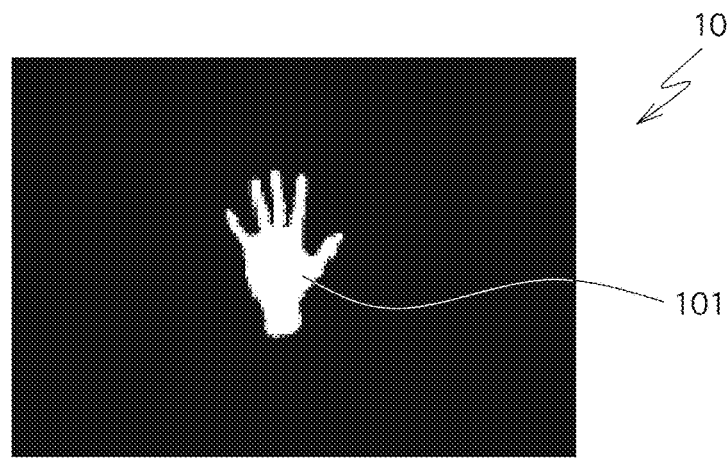
FIG. 1a is a schematic view of a reference image.
Figure 1B:
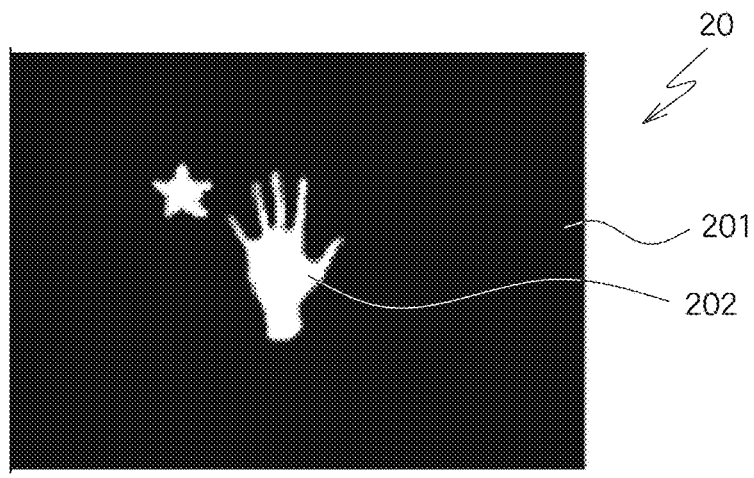
FIG. 1b is a schematic view of a background region with region errors of an image in a segmentation result.

In the present invention, the error amount of the segmented image 20 as shown in FIG. 1b is calculated. Assumed that all of the reference images 10 have B background blocks with a size of m×n, F foreground blocks with a size of m×n, and K error pixels of m×n, it shows that there is an error block. Assumed that there are L background blocks, and the expression is convenient, and the error regions are evenly distributed in the L background blocks, while the error region is in a rectangular shape of s×t, wherein s×t=L. Therefore, the background block $BB_j$, j=1, 2, . . . , L may be set to as the background block with error, and the remaining background block $BB_j$, j=(L+1), . . . , B is the background block not including any error as shown in the following Mathematical Equation 17:

[Mathematical Equation 17]

$$R_{B\_fa}^j = \begin{cases} \frac{K(mn)/L}{mn} = \frac{K}{L}, & j=1, \ldots, L \\ 0, & j=L+1, \ldots, B \end{cases}$$

The enhanced equation is adjusted to obtain the following Mathematical Equation 18:

[Mathematical Equation 18]

$$ER_{B\_fa}^j = \left(\frac{\frac{K}{L} - T}{\left(1-\frac{1}{T}\right)\left(\frac{K}{L} - (1+T)\right)}\right)^t = \left(\frac{T(K-LT)}{(T-1)(K-L(1+T))}\right)^t$$

The following Mathematical Equation 19 is obtained:

[Mathematical Equation 19]

$$ER_{B\_fa}^j = \begin{cases} \left(\frac{T(K-LT)}{(T-1)(K-L(1+T))}\right)^t = ER_{B\_fa} \\ 0 \end{cases}$$

Since the error region is assumed to be a rectangle of s×t, therefore the block may be further analyzed as follows:

1. The blocks situated at four corners include three neighbor blocks.
2. There are 2(s−2)+s(t−2) blocks situated at the perimeter and each block has five neighbor blocks.
3. There are (s−2)×(t−2) blocks situated inside, and each block contains eight neighbor blocks.

The aforementioned parameters are substituted into the modification equations as shown in Mathematical Equations 15 and 16 to calculate the error amount as shown in the following Mathematical Equation 20:

[Mathematical Equation 20]

$$TE_{B\_fa} = \frac{1}{B}\sum_{j=1}^{B} ME_{B\_fa}^j = \frac{1}{L}\sum_{j=1}^{L} ME_{B\_fa}^j =$$

-continued $$\frac{1}{L}\sum_{j=1}^{L}\left(\frac{1}{W_{B\_fa}^{j}}\left(ER_{B\_fa}^{j}\cdot g_{B\_fa}^{j}+\sum_{\substack{B_{h}\in Neighbor(BB_{j})\\ER_{B\_fa}^{j}\geq ER_{B\_fa}^{h}>T}}ER_{B\_fa}^{h}\cdot g_{B\_fa}^{h}\right)\right)=$$

$$\frac{1}{L}\left(4\cdot\frac{1}{4\cdot\frac{K}{L}}\left(ER_{B\_fa}^{j}\cdot\frac{K}{L}+3\cdot ER_{B\_fa}\cdot\frac{K}{L}\right)+\right.$$

$$2((s-2)+(t-2))\cdot\frac{1}{6\cdot\frac{K}{L}}\left(ER_{B\_fa}^{j}\cdot\frac{K}{L}+5\cdot ER_{B\_fa}\cdot\frac{K}{L}\right)+$$

$$\left.(s-2)\times(t-2)\cdot\frac{1}{9\cdot\frac{K}{L}}\left(ER_{B\_fa}^{j}\cdot\frac{K}{L}+8\cdot ER_{B\_fa}\cdot\frac{K}{L}\right)\right)=$$

$$\frac{1}{L}\left(4\cdot\frac{4\cdot ER_{B\_fa}\cdot\frac{K}{L}}{4\cdot\frac{K}{L}}+2((s-2)+(t-2))\cdot\frac{6\cdot ER_{B\_fa}\cdot\frac{K}{L}}{6\cdot\frac{K}{L}}+\right.$$

$$\left.(s-2)\times(t-2)\cdot\frac{9\cdot ER_{B\_fa}\cdot\frac{K}{L}}{9\cdot\frac{K}{L}}\right)=$$

$$\frac{1}{L}\left(st\left(ER_{B\_fa}\cdot\frac{K}{L}\right)\right)=ER_{B\_fa}\cdot\frac{K}{L}=\left(\frac{T(K-LT)}{(T-1)(K-L(1+T))}\right)^{t}\cdot\frac{K}{L}$$

Figure 8:
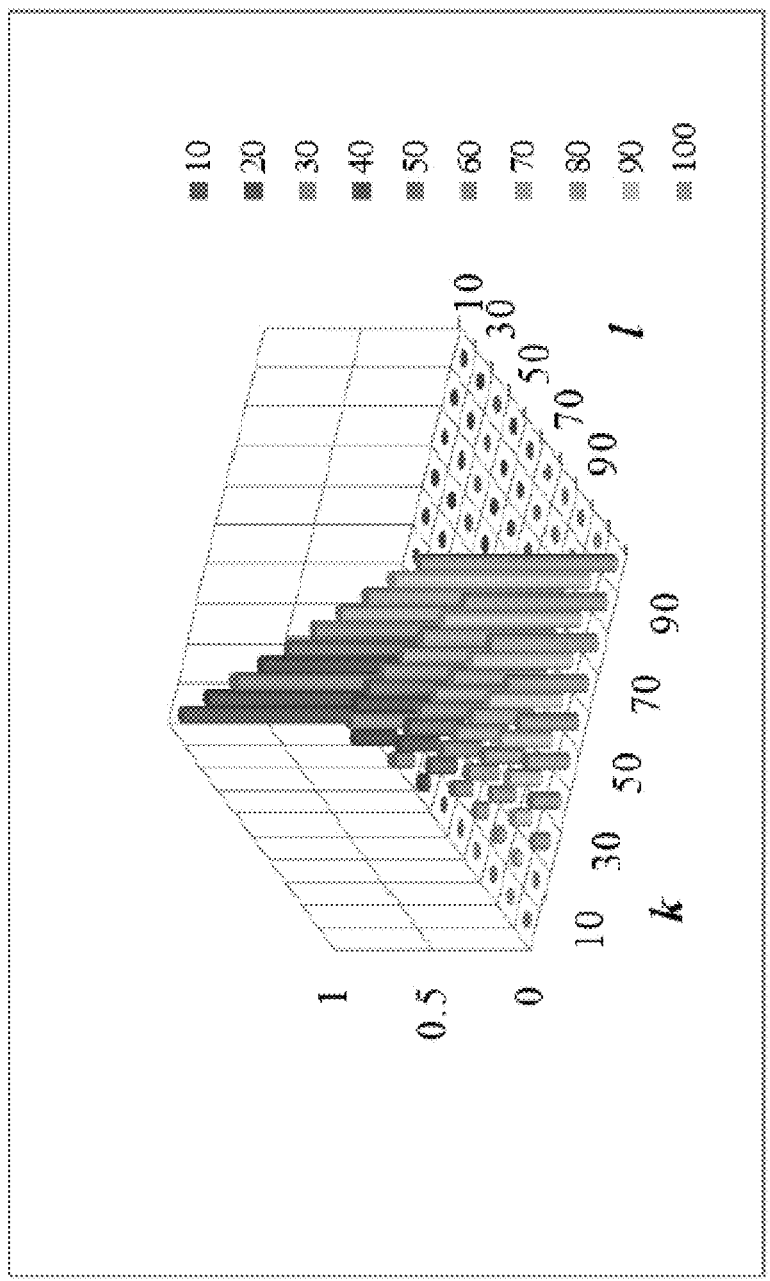
FIG. 8 is an analysis chart of an error measure in accordance with a first preferred embodiment of the present invention

From the Mathematical Equation 20, the error measure analysis is obtained by the enhanced equation and modification equation as shown in FIG. 8. In the same number of L background blocks, the error amount will vary with the error amount (K×m×n error pixels). The larger the error amount, the larger the adjustment of the error amount. With the same error amount, the error amount also varies with the number L of the background block.

Figure 9:
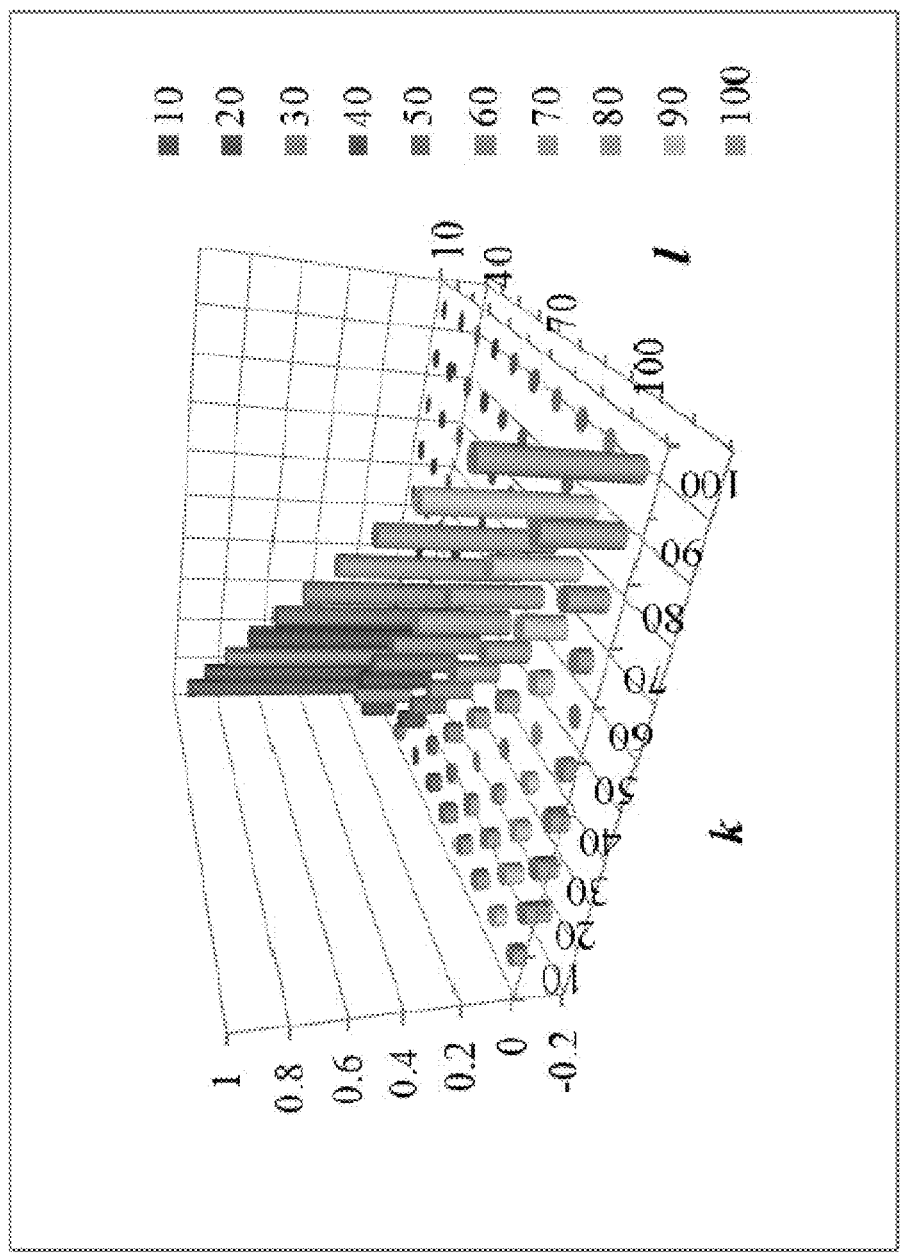
FIG. 9 is an analysis chart showing the difference between the error amount of the first preferred embodiment of the present invention and the prior art.

With reference to FIG. 9 for the difference of error amounts between the present invention and the conventional error measure, if the number L of background blocks has a larger distribution and the error amount is smaller, it shows a scattered error, so that the present invention can suppress the scattered error and has a smaller error amount than the conventional error measure. In the area along the diagonal at the middle of FIG. 9, the further towards the rear side (indicating that each background block has a larger error amount), the greater increase of the error amount.

Preferred Embodiment 2

Figure 10A:
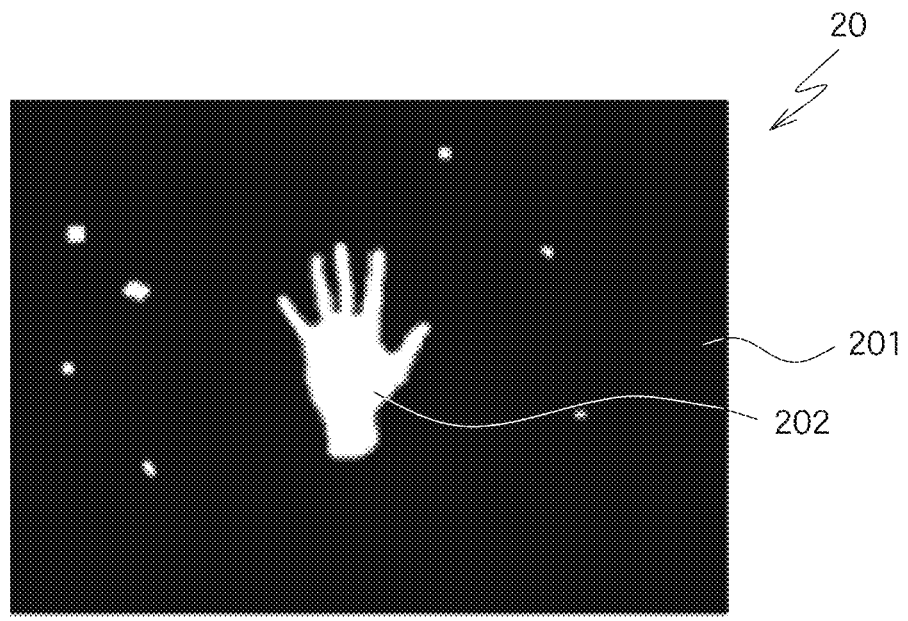
FIG. 10a is a schematic view of a background region with a scattered error of a segmented image.

In FIG. 10*a*, assumed that the errors are evenly distributed in B background blocks, we can assume that $BB_j$, j=1, 2, . . . , B includes an error background block as shown in the following Mathematical Equation 21:

[Mathematical Equation 21]

$$R_{B\_fa}^{j}=\frac{K(mn)}{B(mn)}=\frac{K}{B}$$

It is the same as the prior art, but if the value of K/B is smaller than T, then it will be forced to be 0, and any smaller value will be suppressed by the enhanced equation. It is noteworthy that all other embodiments are similar to the first preferred embodiment and thus will not be repeated.

Preferred Embodiment 3

Figure 1C:
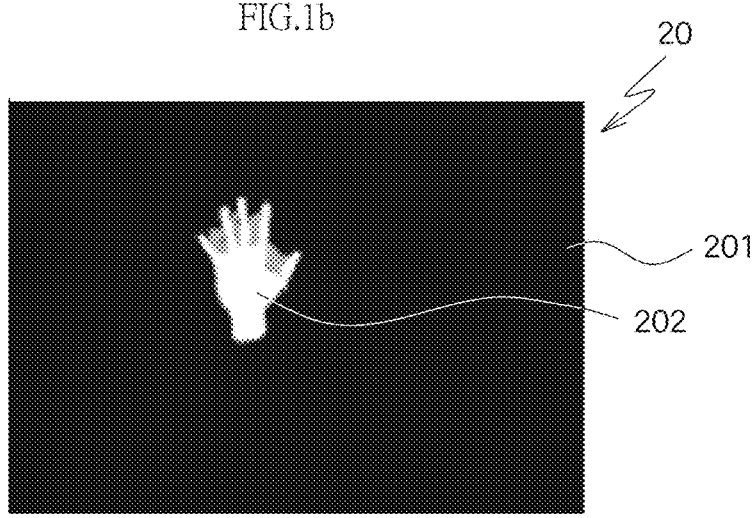
FIG. 1c is a schematic view of a foreground region with region errors of an image in a segmentation result.
Figure 2:
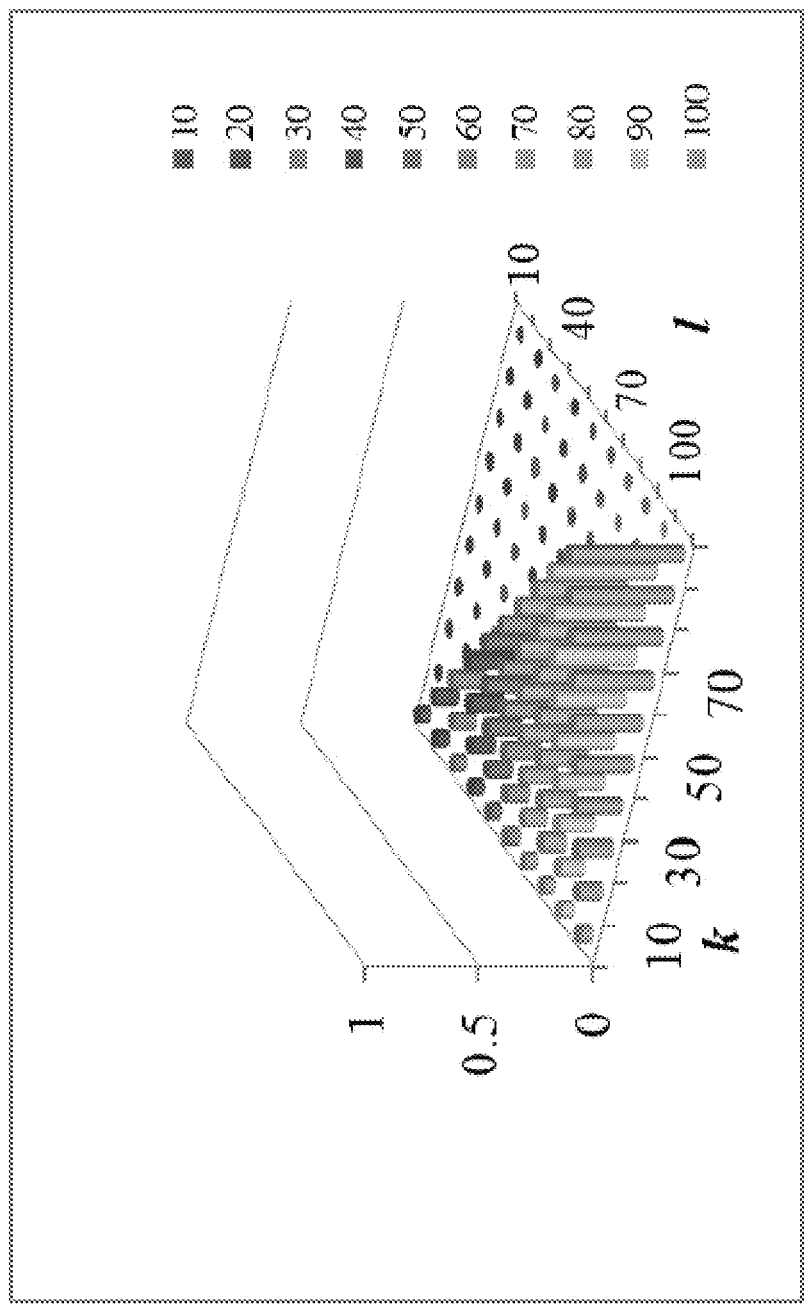
FIG. 2 is an error measure analysis chart based on a conventional pixel error measure method.

In FIG. 1*c*, we assume that all F foreground blocks with a size of m×n have error blocks, and such error region includes P foreground blocks. For simplicity, the errors are assumed to be evenly distributed in the P foreground blocks, and the error region is a rectangle of s×t, wherein s×t=P, so that the foreground block $FB_i$, i=1, 2, . . . , P is assumed to be a foreground block containing an error, and the remaining foreground blocks $FB_i$, i=(P+1), . . . , F are foreground blocks not containing an error as shown in the following Mathematical Equation 22:

[Mathematical Equation 22]

$$R_{F\_fa}^{i}=\begin{cases}\frac{K(mn)/P}{mn}=\frac{K}{P}, & i=1,\ldots,P\\ 0, & i=P+1,\ldots,F\end{cases}$$

The enhanced equation is adjusted to obtain the following Mathematical Equation 23:

[Mathematical Equation 23]

$$ER_{F\_fa}^{i}=\left(\frac{\frac{K}{P}-T}{\left(1-\frac{1}{T}\right)\left(\frac{K}{P}-(1+T)\right)}\right)^{t}=\left(\frac{T(K-PT)}{(T-1)(K-P(1+T))}\right)^{t}$$

So, the following Mathematical Equation 24 is obtained:

[Mathematical Equation 24]

$$ER_{F\_fa}^{i}=\begin{cases}\left(\frac{T(K-PT)}{(T-1)(K-P(1+T))}\right)^{t}=ER_{F\_fa}\\ 0\end{cases}$$

Since the error region is assumed to be a rectangle of s×t, therefore the blocks situated at the corners, the perimeter and inside the rectangle have the same number of neighbor blocks as described above, and these parameters may be substituted directly into the modification equation as shown in the Mathematical Equations 15 and 16 to calculate its error amount according to the following Mathematical Equation 25:

[Mathematical Equation 25]

$$TE_{F\_Fa}=\frac{1}{F}\sum_{i=1}^{F}ME_{F\_fa}^{i}=\frac{1}{P}\sum_{i=1}^{P}ME_{F\_fa}^{i}=$$

$$\frac{1}{P}\sum_{i=1}^{P}\left(\frac{1}{W_{F\_fa}^{i}}\left(ER_{F\_fa}^{i}\cdot g_{F\_fa}^{i}+\sum_{\substack{F_{h}\in Neighbor(FB_{i})\\ER_{F\_fa}^{i}\geq ER_{F\_fa}^{h}>T}}ER_{F\_fa}^{h}\cdot g_{F\_fa}^{h}\right)\right)=$$

$$\frac{1}{P}\left(4\cdot\frac{1}{4\cdot\frac{K}{P}}\left(ER_{F\_fa}^{i}\cdot\frac{K}{P}+3\cdot ER_{F\_fa}\cdot\frac{K}{P}\right)+\right.$$

$$2((s-2)+(t-2))\cdot\frac{1}{6\cdot\frac{K}{P}}\left(ER_{F\_fa}^{i}\cdot\frac{K}{P}+5\cdot ER_{F\_fa}\cdot\frac{K}{P}\right)+$$

$$\left.(s-2)\times(t-2)\cdot\frac{1}{9\cdot\frac{K}{P}}\left(ER_{F\_fa}^{i}\cdot\frac{K}{P}+8\cdot ER_{F\_fa}\cdot\frac{K}{P}\right)\right)=$$

-continued $$\frac{1}{P}\left(4 \cdot \frac{4 \cdot ER_{F\_fa} \cdot \frac{K}{P}}{4 \cdot \frac{K}{P}} + 2((s-2)+(t-2)) \cdot \frac{6 \cdot ER_{F\_fa} \cdot \frac{K}{P}}{6 \cdot \frac{K}{P}} + \right.$$

$$\left. (s-2) \times (t-2) \cdot \frac{9 \cdot ER_{F\_fa} \cdot \frac{K}{P}}{9 \cdot \frac{K}{P}} \right) =$$

$$\frac{1}{P}\left(st\left(ER_{F\_fa} \cdot \frac{K}{P}\right)\right) = ER_{F\_fa} \cdot \frac{K}{P} = \left(\frac{T(K-PT)}{(T-1)(K-P(1+T))}\right)^t \cdot \frac{K}{P}$$

From the Mathematical Equation 25, with the same number of L background blocks, the error amount will vary with the error amount (K m×n error pixels). The larger the error amount, the larger the adjustment of the error amount. With the same error amount, the error amount also varies with the number L of the background block.

Preferred Embodiment 4

Figure 10B:
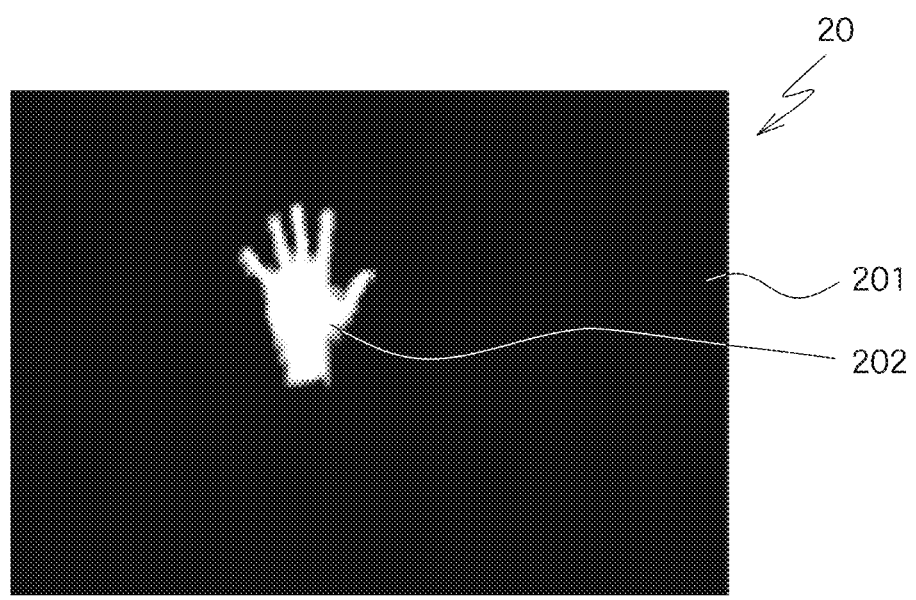
FIG. 10b is a schematic view of a foreground region with a scattered error of a segmented image.

In FIG. 10b, we assume that the errors are evenly distributed in F foreground blocks, the $FB_i$, i=1, 2, ..., F may be assumed to have an error background block as shown in the following Mathematical Equation 26:

[Mathematical Equation 26]

$$R^i_{F\_fa} = \frac{K(mn)}{F(mn)} = \frac{K}{F}$$

As described above, if the value of K/F is smaller than T, then it will be forced to be 0, and any smaller value will be suppressed by the enhanced equation. It is noteworthy that all other embodiments are similar to the first preferred embodiment and thus will not be repeated.

Figure 10C:
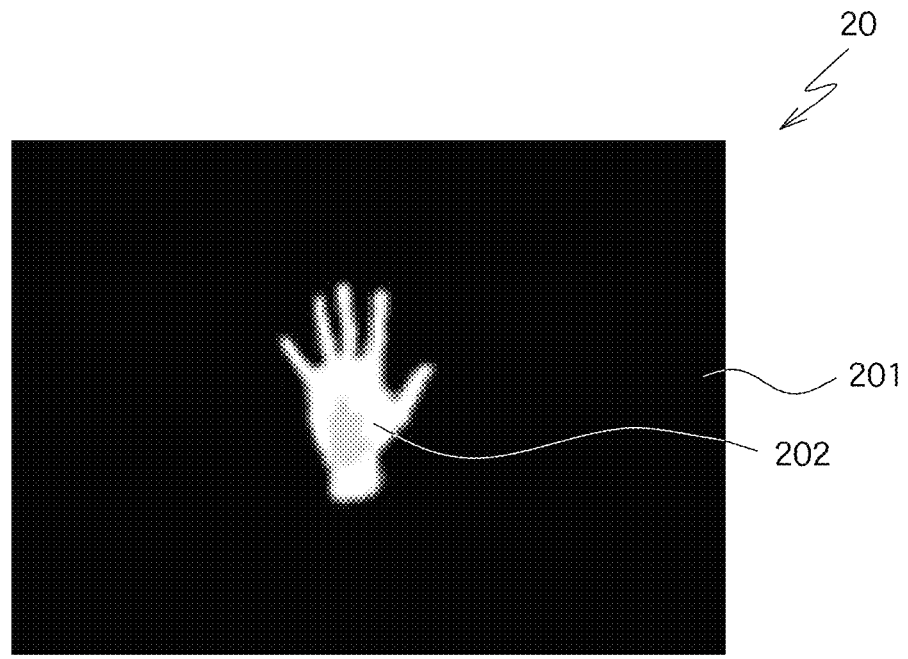
FIG. 10c is a schematic view of a foreground region with a miss detection error of a segmented image.
Figure 10D:
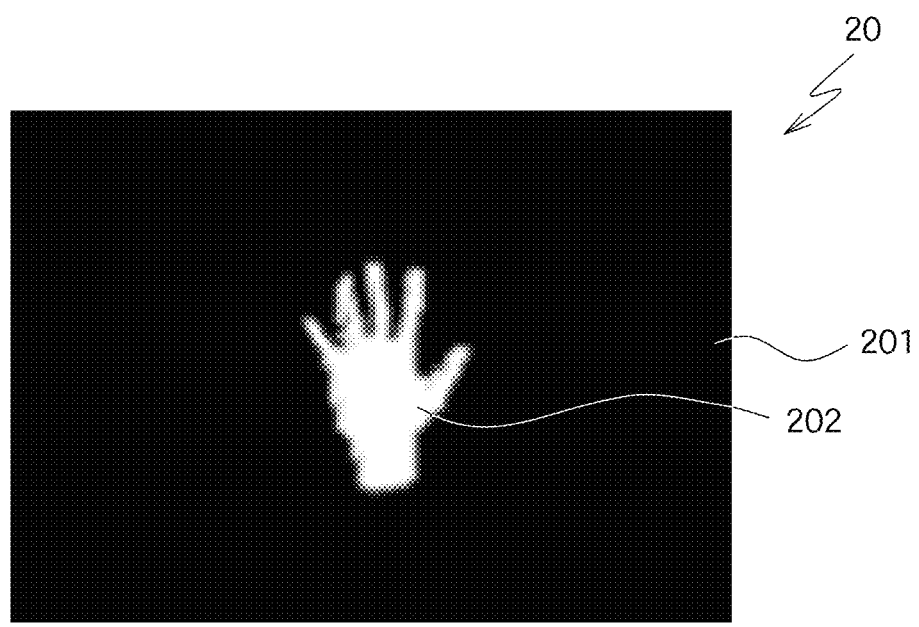
FIG. 10d is another schematic view of a foreground region with a miss detection error of a segmented image.

The present invention may be applied for the miss detection of foreground region as shown in FIGS. 10c and 10d, and the same conclusion can be drawn and thus will not be repeated.

While the invention has been described by means of specific embodiments, numerous modifications and variations could be made thereto by those skilled in the art without departing from the scope and spirit of the invention set forth in the claims.

What is claimed is:

1. A block-base error measure method for object segmentation, comprising the steps of:
   dividing a reference image having at least one object into a plurality of non-overlapping blocks;
   defining the block without the object as a background block, and the remaining part as a foreground region;
   further segmenting the foreground region into a plurality of non-overlapping foreground blocks, wherein the foreground block may contain complete object pixels or contain partial object pixels, called an object part, plus partial non-object pixels, called a non-object part;
   obtaining a miss detected pixel and a foreground false alarm pixel of the foreground block and a background false alarm pixel of the background block after the superimposition;
   superimposing the reference image with the segmented image to obtain an error ratio of the block, the error ratio including a foreground miss detection ratio, a foreground false alarm ratio and a background false alarm ratio, wherein the foreground miss detection ratio is a ratio of the number of miss detected pixels to the total number of pixels of the foreground object block, and the foreground false alarm ratio is the ratio of the number of foreground false alarm pixels to the total number of background pixels of the non-object part, and the background false alarm ratio is the ratio of the number of background false alarm pixels to the total number of pixels of the background block;
   defining a threshold value, and defining an enhanced equation according to the threshold value and the error ratio to convert the error ratio into an enhanced error ratio;
   calculating a modified weight value of the block according to the correlation between the enhanced error ratio of the block and its neighbor block; and
   calculating an error amount of the segmented image according to the modified weight value.

2. The block-base error measure method for object segmentation according to claim 1 further comprising the steps of:
   calculating a ratio weight value according to the error ratio; and
   defining the enhanced equation according to the threshold value, the error ratio, and the ratio weight value.

3. The block-base error measure method for object segmentation according to claim 2, wherein the ratio weight value of the foreground miss detection is the ratio of the total number of miss detected pixels of the foreground object part to the total number of pixels of the foreground block, and the ratio weight value of the foreground false alarm is the ratio of total number of pixels of the non-object part to the total number of pixels of the foreground block, and the ratio weight value of the background false alarm is the ratio of the total number of background false alarm pixels to the total number of pixels of the background block.

4. The block-base error measure method for object segmentation according to claim 3 further comprising the steps of:
   defining a control variable according to the error ratio through the numerical value of the threshold value; and
   providing the error ratio with to the respective control variable to enhance the respective error ratio.

5. The block-base error measure method for object segmentation according to claim 4, wherein the enhanced equation is expressed as Equation 1:

(Equation 1)

$$ER^i_{Fk} = \begin{cases} \left(\frac{R^i_{Fk} - T}{\left(1 - \frac{1}{T}\right) \cdot (g^i_{Fk} - (1+T))}\right)^t, & 0 < t < 1, T \le R^i_{Fk} \le 1, g^i_{Fk} \le 1 \\ 0, & \text{Otherwise} \end{cases}$$

$Fk = \{F\_md, F\_fa\}$ $$ER^j_{Bk} = \begin{cases} \left(\frac{R^j_{Bk} - T}{\left(1 - \frac{1}{T}\right) \cdot (g^j_{Bk} - (1+T))}\right)^t, & 0 < t < 1, T \le R^j_{Bk} \le 1, g^j_{Bk} \le 1 \\ 0, & \text{Otherwise} \end{cases}$$

$Bk = \{B\_fa\}$ wherein, the reference image has F foreground blocks and B background blocks,
i=1, 2, ..., F, j=1, 2, ..., B;

$R_{F\_md}^i$ is a foreground miss detection ratio; $R_{F\_fa}^i$ is a foreground false alarm ratio;

$R_{B\_fa}^j$ is a background false alarm ratio;

$ER_{Fk}^i$ and $ER_{Bk}^j$ are enhanced error ratios of foreground block and background block, respectively;

$g_{F\_md}^i$ is a ratio weight value of foreground miss detection; $g_{F\_fa}^i$ is a ratio weight value of foreground false alarm; $g_{B\_fa}^j$ is a ratio weight value of background false alarm; T is a threshold value; and t is a control variable.

6. The block-base error measure method for object segmentation according to claim 2 further comprising the steps of:

obtaining an error modification value of each block according to a modification equation defined by the enhanced error ratio, the ratio weight value, the threshold value and the modified weight value; and calculating an error amount of the segmented image according to the error modification value.

7. The block-base error measure method for object segmentation according to claim 6, wherein the modified weight value is calculated according to the ratio of the enhanced error ratio of the block and the object included in a neighbor block thereof.

8. The block-base error measure method for object segmentation according to claim 5 further comprising the steps of:

obtaining an error modification value of each block according to a modification equation defined by the enhanced error ratio, the ratio weight value, the threshold value and the modified weight value; and calculating an error amount of the segmented image according to the error modification value;

wherein, the modification equation is shown in the following Equation 2:

(Equation 2)

$$ME_{Fk}^i = \frac{1}{W_{Fk}^i}\left(ER_{Fk}^i \cdot g_{Fk}^i + \sum_{\substack{F_h \in Neighbor(F_i) \\ ER_{Fk}^i \geq ER_{Fk}^h > T}} ER_{Fk}^h \cdot g_{Fk}^h\right), ER_{Fk}^i > T$$

Where $W_{Fk}^i = \sum_{F_l \in \{F_i, Neighbor(F_i)\}} g_{Fk}^l$ $$ME_{Bk}^j = \frac{1}{W_{Bk}^j}\left(ER_{Bk}^j \cdot g_{Bk}^j + \sum_{\substack{B_h \in Neighbor(B_j) \\ ER_{Bk}^j \geq ER_{Bk}^h > T}} ER_{Bk}^h \cdot g_{Bk}^h\right), ER_{Bk}^j > T$$

Where $W_{Bk}^j = \sum_{B_l \in \{B_j, Neighbor(B_j)\}} g_{Bk}^l$ wherein, $ME_{Fk}^i$ and $ME_{Bk}^j$ are error modification values; $g_{Fk}^h$, $g_{Fk}^l$, $g_{Bk}^h$ and $g_{Bk}^l$ are modified weight values, h is an element of a set formed by neighbor blocks of the block, and l is a element of a set formed by the block and the neighbor blocks thereof.

9. The block-base error measure method for object segmentation according to claim 8, wherein the error amounts of a whole image include the average of the errors of all foreground blocks, and the average of the errors of all background blocks, which are obtained according to the following Equation 3:

(Equation 3)

$$TE_{Fk} = \frac{1}{F}\sum_{i=1}^{F} ME_{Fk}^i$$

$$TE_{Bk} = \frac{1}{B}\sum_{j=1}^{B} ME_{Bk}^j$$

wherein, $TE_{Fk}$ and $TE_{Bk}$ are error amounts.

* * * * *